United States Patent [19]
Doshi et al.

[11] Patent Number: 5,411,721
[45] Date of Patent: May 2, 1995

[54] PROCESS FOR THE REJECTION OF $CO_2$ FROM NATURAL GAS

[75] Inventors: Kishore J. Doshi, Somers; William B. Dolan, Dobbs Ferry, both of N.Y.

[73] Assignee: UOP, Des Plaines, Ill.

[21] Appl. No.: 997,810

[22] Filed: Dec. 29, 1992

[51] Int. Cl.$^6$ .................. B01D 53/04; B01D 53/22
[52] U.S. Cl. .................. 423/220; 95/51; 423/230; 423/231
[58] Field of Search ......... 423/220, 225, 230, 231; 95/45, 51

[56] References Cited

U.S. PATENT DOCUMENTS

| | | | |
|---|---|---|---|
| 4,130,403 | 12/1978 | Cooley et al. | 95/51 |
| 4,229,188 | 10/1980 | Intille | 55/16 |
| 4,230,463 | 10/1980 | Henis et al. | 55/16 |
| 4,238,204 | 12/1980 | Perry | 55/16 |
| 4,264,338 | 4/1981 | Null | 95/51 |
| 4,398,926 | 8/1983 | Doshi | 55/16 |
| 4,529,411 | 7/1985 | Goddin, Jr. et al. | 95/51 |
| 4,701,187 | 10/1987 | Choe et al. | 55/16 |
| 4,783,203 | 11/1988 | Doshi | 95/51 |
| 4,830,734 | 5/1989 | Nagji et al. | 585/822 |
| 4,863,492 | 9/1989 | Doshi et al. | 55/16 |
| 4,957,715 | 9/1990 | Grover et al. | 423/228 |
| 5,110,569 | 5/1992 | Jain | 423/230 |

OTHER PUBLICATIONS

Sterically Hindered Amines for $CO_2$ Removal from Gases, by Sartori et al., Industrial Engineering Chemical Fundamentals, vol. 22, pp. 239-249 (1983).

*Primary Examiner*—Wayne Langel
*Attorney, Agent, or Firm*—Thomas K. McBride; John G. Tolomei; Richard P. Silverman

[57] ABSTRACT

A process for the rejection of carbon dioxide from a natural gas feedstream comprising a gas permeable membrane and a multiple bed pressure swing adsorption system to produce a fixed gas product having a desired concentration of carbon dioxide. The permeate stream from the gas permeable membrane system is fed to the PSA unit and a stream essentially free of carbon dioxide gas from the PSA unit is compressed and blended with the non-permeate stream to form the mixed gas product.

22 Claims, 1 Drawing Sheet

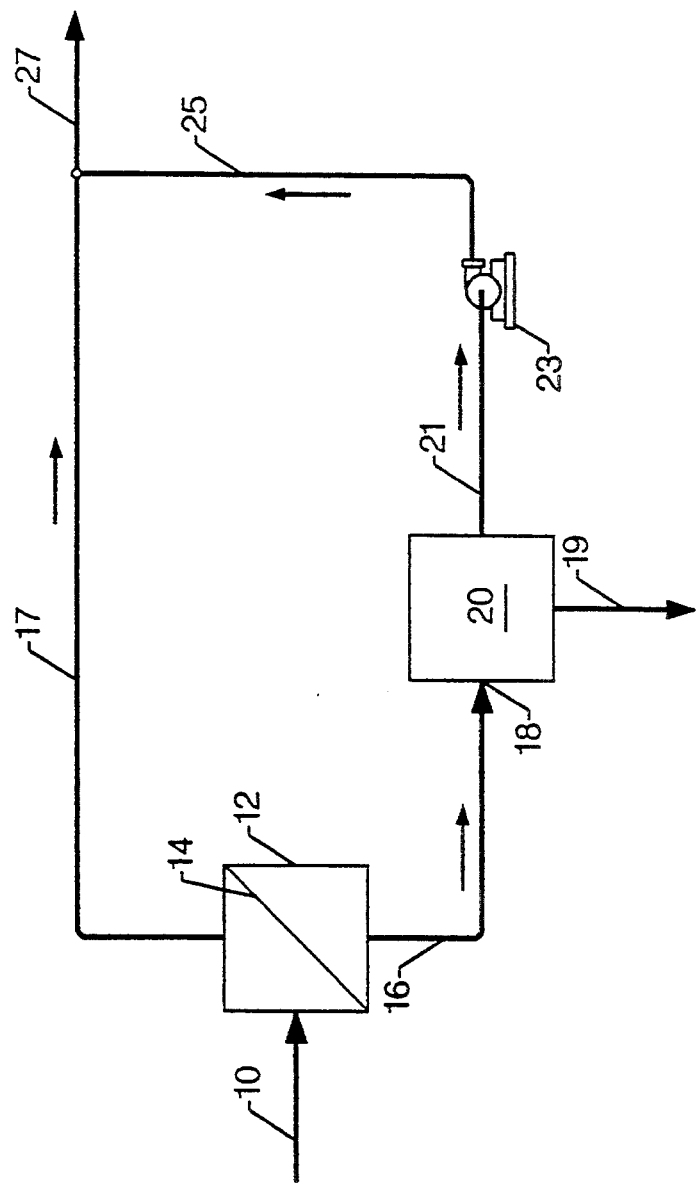

PROCESS FOR THE REJECTION OF $CO_2$ FROM NATURAL GAS

FIELD OF THE INVENTION

This invention relates to a process for the rejection of carbon dioxide from natural gas which integrates a gas permeable membrane system with a multiple bed pressure swing adsorption ("PSA") system for producing a gas product having a desired concentration of carbon dioxide.

BACKGROUND OF THE INVENTION

The treatment of natural gas for the removal of $CO_2$ typically requires the processing of large volumes of gas to produce a treated gas product with about a 1 to about 4 mol % $CO_2$. The $CO_2$ is removed from natural gas for reasons such as improving the heating value of the treated gas for pipeline transmission and, recovering the $CO_2$ from gases associated with oil field $CO_2$ injection for enhanced oil production.

The properties which permit $CO_2$ to be separated from other gases such as hydrocarbons, CO, $N_2$ and air are as follows: weak acidity when dissolved in water, permitting the use of liquid alkaline solutions for absorption of $CO_2$; solubility in water and organic liquids, permitting processes based on solubility rather than chemical affinity; molecular size and structure, permitting the selective adsorption on solid adsorbents, such as molecular sieves; and acidic nature and size and structure, permitting the use of permeable membranes for separation.

Natural gas is a general term which is applied to mixtures of inert and light hydrocarbon components which are derived from natural gas wells or from gas associated with the production of oil. Typically, the quality of the natural gas, as produced, will vary according to the content and amount of inert gases and other impurities in the natural gas. These inert gases such as nitrogen, carbon dioxide, and helium will reduce the heating value of the natural gas. Because natural gas is usually saturated with water, the presence of carbon dioxide in significant amounts may make the natural gas corrosive. Natural gas is conveyed from its source to the consumer in pipelines. As a result, very rigid guidelines have been established by the gas transmission industry to maintain a high quality, safe product. Typical specification for pipeline quality natural gas include: Nitrogen less than 4%, and Carbon dioxide less than 4%.

The most important aspect of any process for treating natural gas is economics. The most critical characteristics of a $CO_2$, removal process are its energy requirements and the concentration level to which $CO_2$ can be lowered in the exit gas. Natural gas is treated in very high volumes making even slight differences of 1–2% in the capital or operating cost of the treating units very significant factors in the selection of process technology. Furthermore, because natural gas is a potentially dangerous and explosive fuel, processes are sought which have high reliability and represent a simplicity of operation.

Absorption systems are commonly used for the removal of $CO_2$ from the natural gas. A physical solvent such as a dimethylether of polyethylene glycol or chemical solvents such as alkanolamines or alkali metal salts are used to wash out carbon dioxide. The $CO_2$ rich solvent is subsequently regenerated by stripping of $CO_2$ with heat. Alkanolamines are not only useful in absorbing carbon dioxide, but they have also been employed to absorb hydrogen sulfide or carbonyl sulfide from gas mixtures which may or may not contain carbon dioxide. Alkanolamines are classified as primary, secondary, or tertiary depending on the number of nonhydrogen substituents bonded to the nitrogen atom of the amino group. Monoethanolamine is an example of a well-known primary alkanolamine. Conventionally used secondary alkanolamines include diethanolamine and diisopropanolamine. Triethanolamine and methyldiethanolamine are examples of tertiary alkanolamines which have been used to absorb carbon dioxide from industrial gas mixtures.

After absorption of carbon dioxide and/or hydrogen sulfide and/or carbonyl sulfide in an alkanolamine solution, the solution is regenerated to remove absorbed gases. The regenerated alkanolamine solution can then be recycled for further absorption. Absorption and regeneration are usually carried out in different separatory columns containing packing or bubble plates for efficient operation. Regeneration is generally achieved in two stages. First, the absorbent solution's pressure is reduced so that absorbed carbon dioxide is vaporized from the solution in one or more flash regenerating columns. Next, the flashed absorbent is stripped with steam in a stripping regenerating column to remove residual absorbed carbon dioxide.

Alkali metal salts such as carbonates, phosphates, borates, phenates of sodium and potassium represent another category of absorbent liquid. The carbon dioxide absorption rates of such salts is, however, rather low, and, therefore, it has been necessary to add promoting agents to these salts. For example, an article by Sartori et al., entitled "Sterically Hindered Amines for $CO_2$ Removal from Gases", *Industrial Engineering Chemical Fundamentals*, Vol. 22, pp. 239–49 (1983) ("Sartori article") discloses activating a basic salt for removing carbon dioxide from gaseous mixtures with sterically hindered amines or amino acids (i.e., a primary amine in which the amino group is attached to a tertiary carbon atom or a secondary amine in which the amino group is attached to a secondary or tertiary carbon atom). Primary and secondary alkanolamines undergo a fast direct reaction with carbon dioxide. However, considerable heat is required to break the bond between the alkanolamine and carbon dioxide in order to regenerate the absorbent. Because tertiary alkanolamines do not bond with carbon dioxide, they can be economically regenerated often by simply reducing pressure in the system (i.e, flash regenerating); little or no thermal regeneration is required. Although the absence of a direct reaction with carbon dioxide makes regeneration of tertiary alkanolamines more economical, large solvent circulation rates and high liquid to gas ratios (i.e., high liquid loadings) in the absorber are required due to the slow absorption of carbon dioxide. Consequently, systems utilizing tertiary alkanolamines require absorption columns of increased height and diameter compared to systems employing either primary or secondary alkanolamines. Typically, the use of either an alkali metal salt absorbent or an alkanolamine absorbent based wet-scrubbing process requires the use of a further dehydration step employing a glycol to dry the gas. Processes are sought which do not require significant amounts of heat for regeneration and which do not require the additional processing step of water removal.

Membranes such as those disclosed in U.S. Pat. No. 4,230,463 to Henis et al. are effective for separating at least one gas component from a gaseous mixture by permeation wherein the membranes are comprised of a coating in occluding contact with a porous separation membrane. Membranes may be used in a single stage or integrated in multiple stages to preferentially separate the more permeable component. However, the membranes will pass a portion of the less permeable gases along with the preferentially separated gas thereby limiting recovery of the non-permeable gases and producing a low quality permeate reject stream. As a result of this limitation, single stages of membranes are often combined with additional membrane stages and recycle of the permeate with the feed to the first stage to improve the separation and reduce losses. However, the additional membrane stages combined with the added recompression costs to recompress the permeate stream and recycle it to the first membrane stage are significant as membranes do not provide any economy of scale with increases in gas capacity for the same separation. The cost of membrane technology is directly proportional to the area of the membrane employed. U.S. Pat. No. 4,130,403 to Cooley et at. is an example of the use of multiple stages of membrane separation to obtain a carbon dioxide-rich permeating gas.

Alternatively carbon dioxide can be rejected from a multiple component gas stream comprising methane and carbon dioxide in a pressure swing adsorption (PSA) system by recovering high purity methane product and rejecting the tail gas comprising carbon dioxide. However, the PSA process doesn't operate efficiently at the pressures at which the natural gas is available, requiting all of the gas feed to the PSA unit to be reduced to a lower adsorption pressure and all of the treated gas to be recompressed to the product gas pressure.

U.S. Pat. No. 4,229,188 discloses a process which combines a PSA and a membrane system to produce a high purity product essentially of a single gas. High purity hydrogen is recovered from a feed gas mixture containing hydrogen by passing the feed gas mixture to a selective adsorption unit to initially separate the hydrogen gas. The low pressure tail gas from the PSA is further treated by a membrane system to recover additional quantity of hydrogen. Alternatively and as taught in U.S. Pat. Nos. 4,398,926 and 4,701,187, the feed gas mixture may initially be separated in a membrane separation unit to provide bulk separation of hydrogen. The separated hydrogen may then be passed to a PSA unit to achieve high purity hydrogen gas at high recovery. In U.S. Pat. No. 4,701,187, the tail gas purge stream from the PSA adsorption unit is compressed and recycled with the feed gas mixture to the membrane unit to form an efficient system.

In U.S. Pat. No. 4,863,492 a gas permeable membrane is combined with a PSA unit to produce a mixed gas product having a preset, adjustably-controlled gas ratio and a high purity second gas component. The permeate stream from the gas permeable membrane is fed to the PSA unit and the taft gas from the PSA unit is compressed and blended with the non-permeate steam to form the mixed gas product.

Membranes have been combined with PSA units to improve the recovery of light components. For example, U.S. Pat. No. 4,238,204 to Perry relates to a selective adsorption process for the recovery of a light gas, especially hydrogen, from a feed gas mixture by using a membrane permeator unit selectively permeable to the light gas to recover a more concentrated light gas from a stream comprising the light gas. The light gas is used to regenerate a selective adsorber unit. The more concentrated light gas is utilized in the selective adsorber unit, either blended with the feed gas mixture, or as a purging gas to improve the recovery of the highly purified light gas product.

U.S. Pat. No. 4,398,926 to Doshi relates to a process for recovery of hydrogen from a gas stream containing hydrogen and impurities. The process achieves the bulk separation of hydrogen from the gas stream in a membrane unit and then separates the hydrogen from the impurities in a PSA unit to produce a purified hydrogen product and a waste gas stream. A high pressure gas stream having a hydrogen content up to 90 mol % is passed to a permeable membrane capable of selectively permeating hydrogen. The separated hydrogen is recovered at reduced pressure and passed to a PSA unit adapted for operation at the reduced pressure. The non-permeate comprising hydrogen from the permeable membrane is recovered essentially at the higher pressure of the gas stream. A portion of the non-permeate is throttled to a lower pressure with appropriate power recovery and is passed to the PSA unit as a co-feed gas. The co-feed gas contributes to the recovery of the purified hydrogen product and a reduction in the operating costs for the desired hydrogen separation and purification.

Membrane and pressure swing adsorption (PSA) processes are safe and simple systems to operate. As dry systems, membrane and PSA processes, are less susceptible to corrosion and other operating problems associated with wet, amine based carbon dioxide removal systems. However, multistage membrane systems require large amounts of compression for efficient operation, which can represent large capital and energy costs. On the other hand, PSA systems are relatively inefficient at high pressures typically encountered in natural gas treating processes.

It is an objective of the invention to develop a simple dry process incorporating efficient use of the membrane and pressure swing processes to produce a natural gas depleted in carbon dioxide, at a high pressure with a minimum requirement of the gas compression.

It is a further object of the invention to provide a low cost, energy efficient process for the separation of carbon dioxide from a natural gas stream without the need for additional processes to remove water from the product natural gas

SUMMARY OF THE INVENTION

The process for the rejection of carbon dioxide from natural gas of the present invention provides a pipeline quality natural gas product at high pressure and a waste stream comprising carbon dioxide with no recompression or recycle of carbon dioxide, and essentially no loss of feedstream components in the system. The instant invention can provide a significant reduction, up to about 50%, in compression horsepower and up to about a 15% decrease in capital cost over a two-stage gas membrane system.

Accordingly, the present invention relates to a process for the rejection of carbon dioxide from a natural gas feedstream. The feedstream comprises carbon dioxide and methane. The process comprises a number of steps. The natural gas feedstream is passed to a gas permeable membrane which operates at a pressure effective to separate the natural gas feedstream into a methane-depleted permeate stream and a carbon dioxide-depleted non-permeate stream. The permeate feedstream is passed to a pressure swing adsorption zone to produce a methane-rich stream essentially free of carbon dioxide and a tail gas stream comprising carbon dioxide. The carbon dioxide-depleted non-permeate stream is combined with the methane-rich stream to provide a combined product natural gas stream having a desired concentration of carbon dioxide.

BRIEF DESCRIPTION OF THE DRAWING

Additional advantages of the present invention will become apparent from the following detailed description of the invention when read in conjunction with the accompanying Figure which is a schematic drawing of the integrated system of the present invention.

DETAILED DESCRIPTION OF THE INVENTION

Feed gas streams suitable for use in the process of the invention may be available as in well-head natural gas streams at a wide range of operating pressure. Pressures of from about 700 to about 13,800 kPa (about 100 to about 1500 psia) may be encountered, although pressures outside this range may also pertain in particular cases. If the feed gas is available at about 700 to about 2070 kPa (about 100 to about 300 psia), it may be desirable to thus compress the gas to a higher pressure, e.g., to about 3450 kPa (about 500 psia) or more for advantageous operation of the membrane system. In other instances, the feed gas stream may be at a higher pressure level than is needed or desired for the membrane separation operation in which case the feed gas stream may actually be depressurized prior to passage to the initial membrane stage at the desired pressure level.

Permeable membrane systems suitable for use in the practice of the invention are available in the art. Such gas separation systems contain a gas permeable membrane capable of selectively permeating a component such as hydrogen, carbon dioxide or other key component in the feed gas generally at relatively high pressures, e.g., pressures typically in excess of about 3450 kPa (about 500 psia), commonly up to about 13,800 kPa (about 2,000 psia) or higher. Inlet means are provided for passing a feed gas at the desired pressure to the feed inlet portion of the separator, with outlet means being provided for withdrawing the key component rich permeate gas from the separator at a reduced pressure. Other outlet means are provided for separately withdrawing the non-permeate portion of the gas stream, i.e., the portion not passing through the membrane, from the separator, essentially at the feed gas pressure. In commercially available embodiments, the permeable membrane is commonly in the form of either spiral wound or hollow fibers, made of cellulose acetate, cellulose triacetate, polysulfone material or any other suitable material, assembled within the separator structure. Such fibers may be assembled into compact bundles to provide a large membrane area available for the passage of the desired product gas therethrough. Using hollow fibers, the feed inlet portion of the separator and the non-permeate gas outlet means are conveniently in fluid communication within the separator on the outside of such hollow fibers. The permeate gas outlet means are then in fluid communication with the inside of the hollow fibers. In practical convenient embodiments, the non-permeate gas outlet means and the permeate gas outlet means are at opposite ends of the separator, with the feed inlet means being positioned near the permeate gas outlet means. In operation, the pressurized feed gas enters the separator, hydrogen, and carbon dioxide or other key component in the feed gas selectively permeates the membrane walls. The key component rich permeate gas passes through the interior of the membrane bores at reduced pressure and is delivered to the outlet means at one end of the separator, while non-permeate gas passes to the outlet means typically positioned at the opposite end of the separator.

Referring now to the Figure which illustrates the basic configuration of the integrated system of the present invention, a feed gas 10 is fed to a membrane separating unit 12 containing at least one gas permeable membrane 14. As one example, the feed gas 10 may be a multi-component high pressure gas stream, such as a natural gas feedstream, comprising carbon dioxide and methane. Typically, the natural gas will contain an amount of carbon dioxide ranging from about 1.0 to about 70 mol %, preferably between about 4 to about 50 mol % and be available at a pressure of between about 700 to about 13,800 kPa (about 100 to about 2000 psia) and preferably between about 3450 to about 10,300 kPa (about 500 to about 1500 psia).

A gas permeable membrane 12 is designed for bulk rejection of a permeable component from a natural gas feedstream. The gas permeable membrane 14 provides a methane-depleted gas stream 16 of permeate gas rich in carbon dioxide at reduced pressure and a high pressure carbon-depleted non-permeate stream 17 containing a mixture of the feed constituents comprising carbon dioxide at a reduced carbon dioxide concentration relative to the feed concentration of carbon dioxide. Thus, the carbon dioxide-depleted non-permeate stream 17 will comprise methane and carbon dioxide in a ratio which will vary based upon the partial pressure difference across the membrane 14 and the flow rate of the input feed natural gas 10. The outlet stream 17 is generally referred to in the art as the non-permeate gas stream. In commercial embodiments, the non-permeate gas stream and the permeate gas stream are discharged at opposite ends of the gas permeable membrane unit 12, with the feed inlet positioned near the permeate gas outlet. In operation, the pressurized feed gas or natural gas stream enters the gas permeable membrane and carbon dioxide selectively permeates the membrane walls. The carbon dioxide-rich permeate gas passes through the interior of the fiber bores at reduced pressure and is delivered to the permeate gas outlet at one end of the membrane, while non-permeate gas passes to the outlet at the opposite end of the membrane. The carbon dioxide-rich permeate stream 16 is fed to the feed end 18 of a PSA unit 20 as a permeate feedstream to the PSA unit.

A methane-rich stream 21 comprising methane and essentially free of carbon dioxide is discharged at one end of the PSA unit 20. The carbon dioxide content of the methane-rich stream will be 3 mol % or less, and be available at a pressure of about 10 psi below the adsorption pressure. The PSA unit 20 also delivers an output stream 19 comprising carbon dioxide from the adsorption beds, which is generally referred to as "tail gas". The tail gas 19 issues at a relatively low pressure. The composition of the tail gas 19 is enriched in carbon dioxide relative to the permeate feed gas stream 18 to the PSA unit. A compressor 23 is used to raise the pressure of the methane-rich stream 21 preferably to the pressure of the non-permeate gas stream 17 from the gas permeable membrane 12. The pressurized methane-rich stream 25 is combined with the carbon dioxide-depleted non-permeate stream 17 to form a combined product natural gas stream 27, having a desired concentration of carbon dioxide, without the requirement for any of the carbon dioxide recovered from the membrane unit and withdrawn in the PSA tail gas to be recompressed. Typically, the desired concentration of carbon dioxide in the combined product natural gas stream is between about 1 and 4 mol %. The tail gas 19 may be vented or used as fuel. Although not shown in the Figure, a portion of the feed gas 10, or natural gas feedstream may be by passed around the gas permeable membrane and combined with the non-permeate gas stream 17.

Pressure swing adsorption (PSA) is of itself a well known means of separating and purifying a less readily adsorbable gas components contained in a feed gas mixture of said component with a more readily adsorbable second component, considered as an impurity or otherwise. Adsorption commonly occurs in multiple beds at an upper adsorption pressure, with the more selectively adsorbable second component thereafter being desorbed by pressure reduction to a lower desorption pressure. The beds may also be purged, typically at such lower pressure for further desorption and removal therefrom of said second component, i.e., the removal of impurities with respect to a high purity product gas, before repressurization of the beds to the upper adsorption pressure for the selective adsorption of said second component from additional quantities of the feed gas mixture as the processing sequence is carried out, on a cyclic basis, in each bed in the PSA system. Such PSA processing is disclosed in the Wagner patent, U.S. Pat. No. 3,430,418, and in the Fuderer et al patent, U.S. Pat. No. 3,986,849, wherein cycles based on the use of multi bed systems are described in detail. Such cycles are commonly based on the release of void space gas from the product end of each bed, in so called cocurrent depressurization step(s), upon completion of the adsorption step, with the released gas typically being employed for pressure equalization and for purge gas purposes. The bed is thereafter countercurrently depressurized and/or purged to desorb the more selectively adsorbed component of the gas mixture from the adsorbent and to remove such gas from the feed end of the bed prior to the repressurization thereof to the adsorption pressure. An evacuation step may be added following the countercurrent depressurization step and before the repressurization step to further remove the adsorbed component from the adsorbent. Furthermore, a portion of the permeate feedstream may be used as a fuel gas stream.

It is within the scope of the present invention for the PSA system to produce a secondary product gas at a much lower pressure than the pressure of the high purity product gas. The secondary product from the PSA system is produced by the addition of a coeurrent depressurization step to the PSA cycle. In a typical PSA cycle, at least one adsorbent bed of a multiple adsorbent bed system undergoes an adsorption step wherein the feed gas is introduced at a feed end of the adsorbent bed and the high purity product or in this invention methane-rich stream is withdrawn from the effluent end of the adsorbent bed. The adsorbent bed is then cocurrently depressurized in an equalization step and the equalization gas is used to repressure another adsorbent bed. The cocurrent depressurization step is continued to provide a purge gas for regeneration of another adsorbent bed. At the end of the provide purge step, typically the adsorbent bed is countercurrently depressurized to the lowest desorption pressure. Typically, the lowest desorption pressure ranges from about 350 kPa (50 psia) to about atmospheric pressure. Preferably, the lowest desorption pressure is below atmospheric pressure. This countercurrent depressurization step is also known as a blowdown step. In the instant invention, for the production of the secondary product stream, the adsorption bed is cocurrently depressurized following the provide purge step to provide the secondary product gas. The adsorbent bed is then countercurrently depressurized and the waste gas, or tail gas stream is withdrawn. The tail gas stream may be vented, flashed or used as a low grade fuel. The secondary product gas stream would contain substantially more carbon dioxide impurity than the high purity product gas. In the operation of a PSA system of the present invention to reject carbon dioxide, preferably the high purity product gas or methane-rich stream essentially free of carbon dioxide will contain less than about 4 mol % carbon dioxide, more preferably less than about 1 to about 4 mol % and most preferably about 2 to about 4 mol %, and the secondary product gas stream will contain about 5 to about 15 mol % carbon dioxide. The secondary product gas can be used as a fuel, to drive the compressor, or to generate electrical power through the use of gas turbines.

The PSA system can be operated with at least one, and typically at least two adsorbent beds, as may be desirable in given applications, with from 3 to about 12 or more adsorbent beds commonly being employed in conventional practice. As in conventional practice, any suitable adsorbent material may be used in the PSA system of the invention. Suitable adsorbents known in the art and commercially available include crystalline molecular sieves, activated clays, silica gels, carbon molecular sieves and the like. Such adsorbent material or mixtures thereof will be understood to be suitable if the adsorbent material is capable of selectively adsorbing impurities such as carbon dioxide from a natural gas stream. The molecular sieves include, for example, the various forms of silicoaluminophosphates and aluminophosphates disclosed in U.S. Pat. Nos. 4,440,871; 4,310,440 and 4,567,027, hereby incorporated by reference as well as zeolitic molecular sieves.

As used here, the term "molecular sieve" is defined as a class of adsorptive desiccants which are highly crystalline in nature, distinct from amorphous materials such as gamma-alumina. Preferred types of molecular sieves within this class of crystalline absorbents are aluminosilicate materials commonly known as zeolites. The term "zeolite" in general refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns. The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Å units, whereas calcium zeolite A has an apparent pore size of about 5 Å units. The term apparent pore size as used herein may be defined as the maximum critical dimension of the molecular sieve in question under normal conditions. The apparent pore size will always be larger than the effective pore diameter, which may be defined as the free diameter of the appropriate silicate ring in the zeolite structure.

Zeolitic molecular sieves in the calcined form may be represented by the general formula;

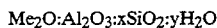

$$Me_2O:Al_2O_3:xSiO_2:yH_2O$$

where Me is a cation, x has a value from about 2 to infinity, n is the cation valence and y has a value of from about 2 to 10.

The general chemical formula for a molecular sieve composition known commercially as type 13X is:

$$1.0\pm0.2Na_2O:1.00Al_2O_3:2.5\pm0.5SiO_2$$

plus water of hydration. Type 13X has a cubic crystal structure which is characterized by a three-dimensional network with mutually connected intra-crystalline voids accessible through pore openings which will admit molecules with critical dimensions up to 10 Å. The void volume is 51 vol. % of the zeolite and most adsorption takes place in the crystalline voids.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicate disclosed in U.S. Pat. No. 4,073,865, hereby incorporated by reference. Detailed descriptions of some of the above-identified zeolites may be found in D. W. Breck, *Zeolite Molecular Sieves*, John Wiley and Sons, New York, 1974, hereby incorporated by reference.

Another suitable zeolite molecular sieve material is Zeolite NU-1, as described in U.S. Pat. No. 4,060,590, hereby incorporated by reference. Preferably, the adsorbent selective for the adsorption of carbon dioxide is selected from the group consisting of molecular sieve zeolites such as 13X, Zinc X. Preferably, the adsorbent selective for the adsorption of carbon dioxide is selected from the group consisting of molecular sieve zeolites, such as 13X, Zinc X, NU-1 and mixtures thereof.

From the description above, it will be appreciated that the operating pressures employed will vary for each particular application, depending on a variety of factors such as the feed gas stream to be separated, the purity and recovery levels desired, the permeable membrane material employed, the adsorbent employed in the PSA system, the particular of the overall integrated system, the particular PSA cycle employed, the number of beds in the PSA system, the size and configuration of the membrane stages, and the like. In general, however, for efficient separation it Is desirable to employ the PSA system at an adsorption pressure below about 3450 kPa (about 500 psia). While such higher pressures can be employed in the PSA system, lower pressure levels are advantageous, particularly in the coordinating of the reduced pressure of the permeate gas from the membrane system with the upper adsorption pressure of the PSA system. An adsorption pressure of from about 350 to about 3450 kPa (about 50 to about 500 psia), preferably from about 350 to about 1725 kPa (about 50 to 250 psia) is generally convenient and preferred for the purposes of the invention. Similarly, membrane separation systems are commonly operated at higher pressure levels in excess or about 3450 kPa (about 500 psia), and up to about 13,800 kPa (about 2000 psia) or higher. As indicated above, the pressure of a feed gas to any membrane system of the invention, and the reduced permeate pressure, and hence the pressure differential across the membrane stage, can be determined to provide a desired degree of gas separation therein. The pressure differential across the membrane stage, determined by the pressure of the feed gas and/or of the permeate gas, will be related to the degree of separation desired at that separation stage and the overall recovery level desired for the gas separation operation, typically the result of a balance of recovery and compression costs as indicated above. In the operation of individual membrane stages, the lower the purity of the feed gas passed thereto, the higher will be the pressure differential, i.e, the driving force, across the membrane m achieve any particular level of permeate gas purity therefrom.

Further, it should be understood that the process at the instant invention may be used together with existing or new facilities to remove sulfur containing gases from natural gas. For example, the carbon-dioxide depleted non-permeate stream may be passed to sulfur removal unit (containing a sorbent or a chemisorbent, selected from the group consisting of zinc oxide or iron oxide and mixtures thereof to remove traces of $H_2S$ and provide a sulfur-reduced non-permeate stream. Preferably, the traces of $H_2S$ in the non-permeate stream will range between about 4 ppm-wt and about 50 ppm-wt. The sulfur-reduced non-permeate stream is combined with the methane-rich stream from the pressure swing adsorption zone to provide a combined product natural gas stream having a desired concentration of carbon dioxide and sulfur. The use of the membrane unit in conjunction with the desulfurizer reduces the required capacity of the desulfurizer by removing the carbon dioxide and a portion of the $H_2S$ from the non-permeate stream.

In another embodiment of a multiple membrane module flowscheme, the methane-depleted permeate stream is recompressed and is passed to a second membrane module to further reject carbon dioxide from the methane-depleted permeate stream and to provide a second non-permeate stream depleted in carbon dioxide and a carbon dioxide-rich permeate stream. The carbon dioxide-rich permeate stream is withdrawn. The second non-permeate stream depleted in carbon dioxide is passed to the pressure swing adsorption zone to provide a methane-rich stream essentially free of carbon dioxide and a tail gas stream comprising carbon dioxide. The methane-rich stream is combined with the non-permeate stream from the first membrane module to produce the sales gas product. This scheme is employed to maintain the concentration of carbon dioxide in the feed to the pressure swing adsorption below about 50 mol % carbon dioxide. Excess carbon dioxide is withdrawn as a secondary product from the second membrane.

Still further, it should be understood that the process of the instant invention may be used with a gas permeable membrane consisting of one membrane module or at least two membrane modules in parallel or with any combination of membrane modules in series and parallel arrangements may be utilized in treating a natural gas. In one embodiment of a multiple membrane module flowscheme, the natural gas stream is passed to a first membrane module to provide a first non-permeate stream and a first permeate stream. The first non-permeate stream is passed to a second membrane module to provide the carbon dioxide-depleted non-permeate stream and a second permeate stream. The first and second permeate streams are combined and the combined permeate stream is passed to the pressure swing adsorption zone. Compression may be provided for the second permeate stream and the combined permeate stream to raise the pressure of the combined permeate stream to the PSA adsorption pressure. The addition of the second membrane stage permits the non-permeate stream to be brought closer to the desired carbon dioxide concentration prior to combining the non-permeate stream with the methane-rich gas from the PSA. This lowering of the pressure of the second permeate stream below the pressure of the first permeate stream boosts the driving force for the separation of carbon dioxide in the second membrane.

The invention will be further clarified by a consideration of the following examples which are based on engineering design calculations, and which are not intended to be limiting to the use of the invention.

EXAMPLE 1

A natural gas feedstream containing 15 mol % carbon dioxide, 85 mol % methane, and saturated with water and available at a pipeline pressure of 8,300 kPa (1200 psia) is treated in a two-stage membrane to reduce the carbon dioxide content to 4 mol %. The natural gas feedstream at a rate of 50 million standard cubic feed per day (MMSCFD) is admixed with a recycle stream at the rate of 6.3 MMSCFD at a pressure of 1200 psia. The recycle stream has a carbon dioxide content approximately equal to that of the feedstream at 15 mol %. The mixture is charged to a first membrane stage to provide a non-permeate product stream of 1.16 MMNm$^3$ per day (43.3 MMSCFD) with carbon dioxide content of 4 mmol %, and a first permeate stream at a rate of 0.37 MMNm$^3$ per day (13.0 MMSCFD), a pressure of 240 kPa (35 psia) and about 51.6 mol % carbon dioxide. The first permeate stream was compressed to a pressure of about 8300 kPa (1200 psia) and charged to the second membrane stage to provide a second non-permeate stream which is the recycle stream to the first membrane stage and a permeate carbon dioxide rich stream at a rate of about 0.18 MMNm$^3$ per day (about 6.7 MMSCFD), at a pressure of 138 kPa (17 psia).

EXAMPLE 2

Example 2 illustrates the process of the instant invention as shown in the Figure as a combination of a permeable membrane and a pressure swing adsorption zone. In Example 2, the natural gas feedstream of Example 1 was charged to the permeable membrane at a rate of 1.34 MMNm$^3$/day (50 MMSCFD). No recycle of unrejected carbon dioxide is required. The non-permeate stream was produced at the rate of 1.01 MMNm$^3$/day (37.7 MMSCFD) with a 4 mmol % concentration of carbon dioxide. A permeate stream at a rate of 12.3 MMSCFD, a pressure of 580 kPa (85 psia) and with 48.6 mol % $CO_2$ was withdrawn from the permeable membrane and passed to the PSA zone operating at an adsorption pressure of the permeate stream pressure. A PSA product stream comprising methane was withdrawn at a rate of 0.15 MMNm$^3$/day (5.6 MMSCFD) at a pressure of 510 kPa (75 psia) and having a concentration of about 4 mol % $CO_2$. The PSA product stream after recompression was combined with the non-permeate stream to provide 1.16 MMNm$^3$/day (43.3 MMSCFD) of a combined product natural gas stream having a concentration of $CO_2$ of 4 mol %. A tail gas stream comprising $CO_2$ was withdrawn from the PSA zone at a rate of 0.18 MMNm$^3$/day (6.7 MMSCFD) and at a pressure of 117 kPa (17 psia). Regeneration of the PSA adsorbent was carried out at a subatmospheric pressure of about 35 kPa (5 psia).

EXAMPLE 3

Example 3 illustrates the process of instant invention as shown in the Figure as a combination of a permeable membrane and pressure swing adsorption zone. In Example 3, the permeate gas from the membrane unit was compressed to 1660 kPa (240 psia) to provide feed to the pressure swing adsorption unit operating at an adsorption pressure of the compressed permeate gas stream. The regeneration of the PSA adsorbent was carried out at atmospheric pressure eliminating the need for a vacuum compressor. The natural gas feedstream of Example 1 was charged to the permeable membrane at a rate of 1.34 MMNm$^3$/day (50 MMSCFD). No recycle of unrejected carbon dioxide was required. The non-permeate stream was produced at the rate of 1.01 MMNm$^3$/day (37.7 MMSCFD) with a 4 mol % concentration of carbon dioxide. A permeate stream at a rate of 12.3 MMSCFD, a pressure of 580 kPa (85 psia) and with 48.6 mol % $CO_2$ was withdrawn from the membrane, compressed to a pressure of 1660 kPa (240 psia) and passed to the PSA zone. A methane-rich stream was withdrawn at a rate of 0.14 MMNm$^3$/day (5.4 MMSCFD) having a concentration of about 4 mol % $CO_2$. The methane-rich stream was compressed from 1590 kPa (230 psia) and combined with the non-permeate stream to provide 43.1 MMSCFD of a combined natural gas product stream having a concentration of 4 mol % $CO_2$. A tail gas stream comprising $CO_2$ was withdrawn from the PSA zone at a rate of 0.185 MMNm$^3$/day (6.9 MMSCFD) and at a pressure of 117 kPa (17 psia).

EXAMPLE 4

Table 1 summarizes the capital and operating cost parameters of Examples 1, 2 and 3. By way of review, Example 1 employed two stages of membranes whereas Examples 2 and 3 by way of comparison employed the integrated membrane and PSA zone of the instant invention. A vacuum compressor was employed for adsorbent regeneration in Example 2. Example 3 used no vacuum regeneration since it operated at a much higher adsorption pressure of about 1660 kPa compared to the about 510 kPa adsorption pressure of Example 2. Examples 2 and 3 illustrated the versatility of the PSA zone for purification and removal of $CO_2$. Since the PSA zone produced a product of the desired specification, the need for recycle to the semi permeable membrane is eliminated. The compression requirement of the instant invention is significantly reduced because purification of the CO$_2$-rich permeate gas is carded out at a substantially lower pressure in a PSA zone (an adsorption pressure of 85 to 240 psia) compared to a feed gas pressure of 1200 psia for the second stage of membrane in Example 1.

By comparison, the process of the instant invention as shown in Examples 2 and 3 resulted in a greater than 50% reduction in the amount of compression horsepower over Example 1 and about 10 to 15% savings in capital investment over Example 1.

TABLE 1

|  | Example 1 | Example 2 | Example 3 |
|---|---|---|---|
| Feed, MMSCFD | 50 | 50 | 50 |
| Purified Product MMSCFD | 43.3 | 43.3 | 43.1 |
| Compression, BHP | 3160 | 1340 | 1450 |
| Relative Capital Investment | 1.0 | 0.87 | 0.9 |

As indicated above, the driving force across the membrane can be adjusted to achieve various degrees of initial bulk separation by using different pressure levels for the permeate gas recovered. In the instant invention, such factors together with the pressure levels employed in the PSA cycle, can be varied, from case-to-case, to optimize the recovery level and compression costs associated with the production of high purity product gas.

The invention will thus be seen to enable permeable membranes to be advantageously employed for bulk separation of carbon dioxide from natural gas streams, while achieving desired high purity product gas by the advantageous use of PSA technology and systems. In this highly useful integration, desired product recovery levels can be maintained while the relationship of the product recovery to the compression and other costs associated with the gas separation operation can be balanced to reflect the needs and requirements pertaining to any given operation.

I claim:

1. A process for the rejection of carbon dioxide from a natural gas feedstream comprising carbon dioxide and methane comprising the following steps:
   (a) passing the natural gas feedstream to a gas permeable membrane operating at a pressure effective to separate said natural gas feedstream into a methane-depleted permeate stream comprising carbon dioxide and into a carbon dioxide-depleted non-permeate stream:
   (b) passing the methane-depleted permeate stream to a pressure swing adsorption zone to produce a methane-rich stream essentially free of carbon dioxide and a tail gas stream comprising carbon dioxide: and
   (c) combining said carbon dioxide-depleted non-permeate stream with said methane-rich stream to provide a combined product natural gas stream having a desired concentration of carbon dioxide reduced relative to the feedstream.

2. The process of claim 1 further comprising compressing the methane-depleted permeate stream to an upper adsorption pressure prior to passing said methane-depleted permeate stream to said pressure swing adsorption zone.

3. The process of claim 2 wherein said upper adsorption pressure is a pressure ranging from about 350 to about 1725 kPa(about 50 to about 250 psia).

4. The process of claim 1 further comprising regenerating said pressure swing adsorption zone at a lowest desorption pressure below atmospheric pressure.

5. The process of claim 1 further comprising withdrawing a portion of the methane-depleted permeate stream as a fuel stream.

6. The process of claim 1 further comprising compressing the methane-rich stream to a pressure level consistent with said carbon dioxide-depleted non-permeate stream.

7. The process of claim 6 further comprising withdrawing a secondary product gas stream from said pressure swing adsorption zone.

8. The process of claim 7 wherein said secondary product gas stream contains about 5 to about 15 mol % carbon dioxide.

9. The process of claim 7 wherein the secondary product gas stream is used to provide fuel.

10. The process of claim 1 wherein the pressure effective to separate said feedstream into said permeate stream and said non-permeate stream in said gas permeable membrane is a pressure ranging from about 3450 to about 10,300 kPa (500 to about 1500 psia).

11. The process of claim 1 wherein the carbon dioxide in said natural gas feedstream ranges from about 4 to about 50 mol %.

12. The process of claim 1 wherein the desired concentration of carbon dioxide in said combined product natural gas stream ranges from about 1 to about 4 mol %.

13. A process according to claim 1 further comprising by-passing a portion of said natural gas feedstream around said permeable membrane and combining said feedstream with said non-permeate stream.

14. A process according to claim 1, wherein the adsorbent selective for the adsorption of carbon dioxide is selected from the group consisting of molecular sieve zeolites, silica gel, silicates, carbon molecular sieves, and mixtures thereof.

15. The process of claim 14 wherein the molecular sieve zeolites are selected from the group consisting of zeolite 13X, Zinc X, NU-1 and mixtures thereof.

16. A process according to claim 1 wherein the adsorbent selective for the adsorption of carbon dioxide is silica gel.

17. The process of claim 1 further comprising: passing the carbon dioxide-depleted non-permeate stream to a sulfur removal unit to remove traces of H$_2$S prior to combining said non-permeate stream with said methane-rich stream.

18. The process of claim 17 wherein the sulfur removal unit contains a sorbent.

19. The process of claim 18 wherein the sorbent is a chemisorbent selected from the group consisting of zinc oxide, iron oxide and mixtures thereof.

20. The process of claim 1 further comprising passing said permeate stream to a second membrane module to further reject carbon dioxide from said permeate stream and to provide a carbon dioxide-rich permeate stream and withdrawing said carbon dioxide-rich permeate stream.

21. The process of claim 1 further comprising: passing said non-permeate stream to a second membrane module to provide a second permeate stream and combining said second permeate stream with said methane-depleted permeate stream prior to passing said methane-depleted permeate stream to said pressure swing adsorption zone.

22. The process of claim 21 further comprising recompressing said second permeate stream prior to combining said second permeate stream with said methane-depleted permeate stream.

* * * * *